United States Patent
Rivera

(10) Patent No.: US 10,348,351 B2
(45) Date of Patent: Jul. 9, 2019

(54) SMART PHONE ACOUSTIC ENHANCER

(71) Applicant: Adrian Rivera, Whittier, CA (US)

(72) Inventor: Adrian Rivera, Whittier, CA (US)

( * ) Notice: Subject to any disclaimer, the term of this patent is extended or adjusted under 35 U.S.C. 154(b) by 48 days.

(21) Appl. No.: 15/390,298

(22) Filed: Dec. 23, 2016

(65) Prior Publication Data

US 2018/0183479 A1    Jun. 28, 2018

(51) Int. Cl.
| | | |
|---|---|---|
| *H04M 1/03* | (2006.01) | |
| *H04M 1/04* | (2006.01) | |
| *G10K 11/00* | (2006.01) | |
| *G10K 11/18* | (2006.01) | |
| *H04B 1/3877* | (2015.01) | |

(52) U.S. Cl.
CPC ......... *H04B 1/3877* (2013.01); *G10K 11/004* (2013.01); *G10K 11/18* (2013.01); *H04M 1/035* (2013.01); *H04M 1/04* (2013.01)

(58) Field of Classification Search
CPC .... G10K 11/025; G10K 11/22; H04M 1/6041
USPC ........ 181/187, 177, 176, 175, 178, 179, 192
See application file for complete search history.

(56) References Cited

U.S. PATENT DOCUMENTS

| | | | | |
|---|---|---|---|---|
| 6,278,789 B1* | 8/2001 | Potter | ................. | H04R 1/2857 181/151 |
| 7,506,721 B2* | 3/2009 | Moore | ................. | H04R 1/2865 181/148 |
| 7,584,820 B2* | 9/2009 | Parker | ................... | G10K 11/22 181/148 |
| 8,256,568 B2* | 9/2012 | Lin | ...................... | H04B 1/3888 181/176 |
| 8,327,974 B1* | 12/2012 | Smith, Jr. | .............. | H04R 1/345 181/152 |
| 8,522,917 B1* | 9/2013 | Oh | ......................... | G10K 11/08 181/148 |
| 8,944,209 B1* | 2/2015 | Fields | ................... | G10K 11/08 181/178 |
| 9,232,030 B2* | 1/2016 | Freshman | .......... | H04M 1/0202 |

\* cited by examiner

*Primary Examiner* — Forrest M Phillips
(74) *Attorney, Agent, or Firm* — IP Strategies

(57) ABSTRACT

A smart phone acoustic enhancer provides a support body and sound enhancing acoustic passages ending in horns. The body allows either vertical or horizontal placement of the smart phone, and includes entry ports into the sound enhancement acoustic passages for both vertical and horizontal smart phone positions. The ports align with smart phone speakers in both vertical and horizontal smart phone positions and flow into the sound enhancement acoustic passages. The horns are formed at ends of the acoustic passages to improve an acoustic impedance match between a sound source and free air thereby improving the efficiency with which sound waves are transferred to the air. The body is preferably assembled from two pieces, both pieces made by injection molding.

20 Claims, 4 Drawing Sheets

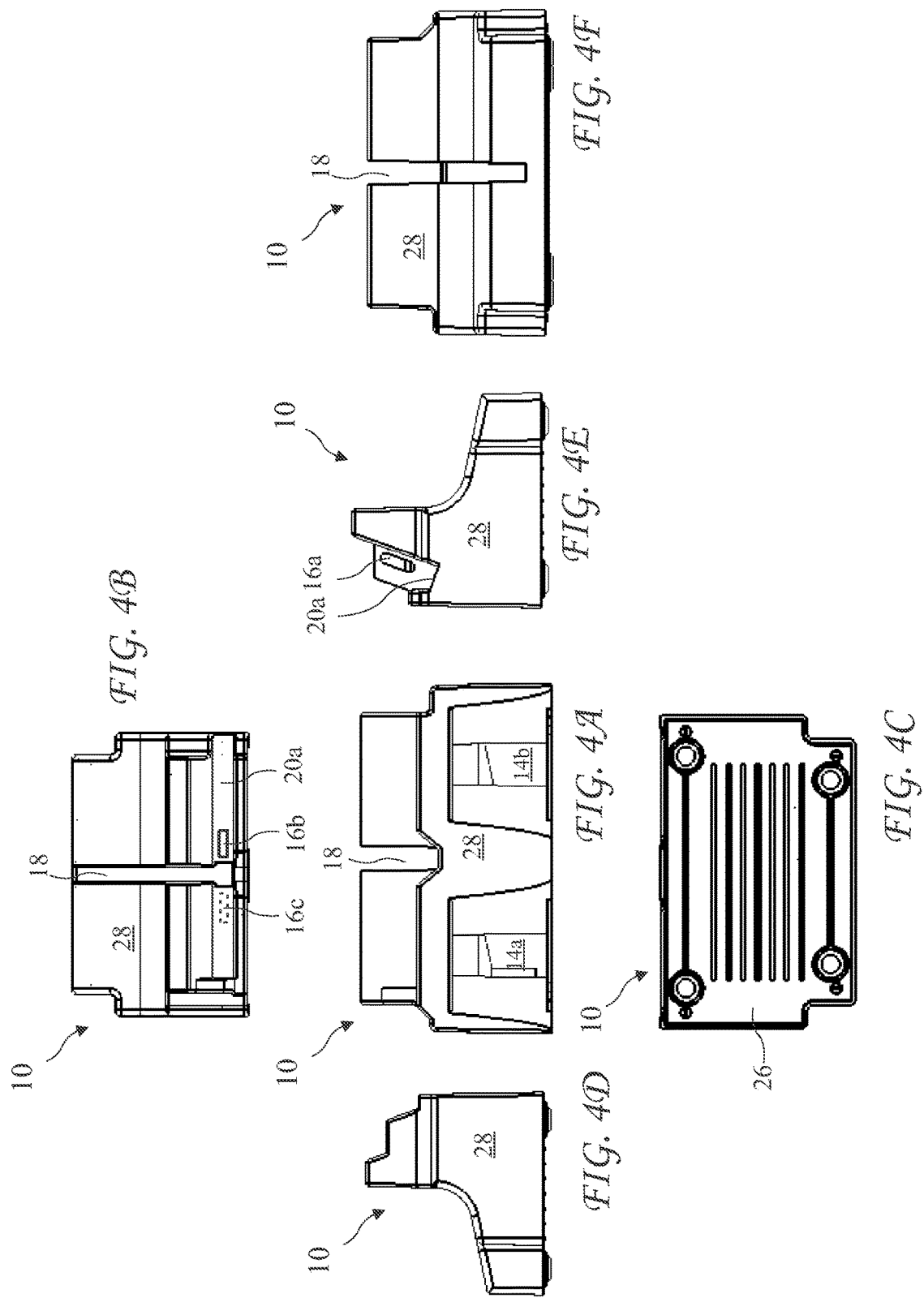

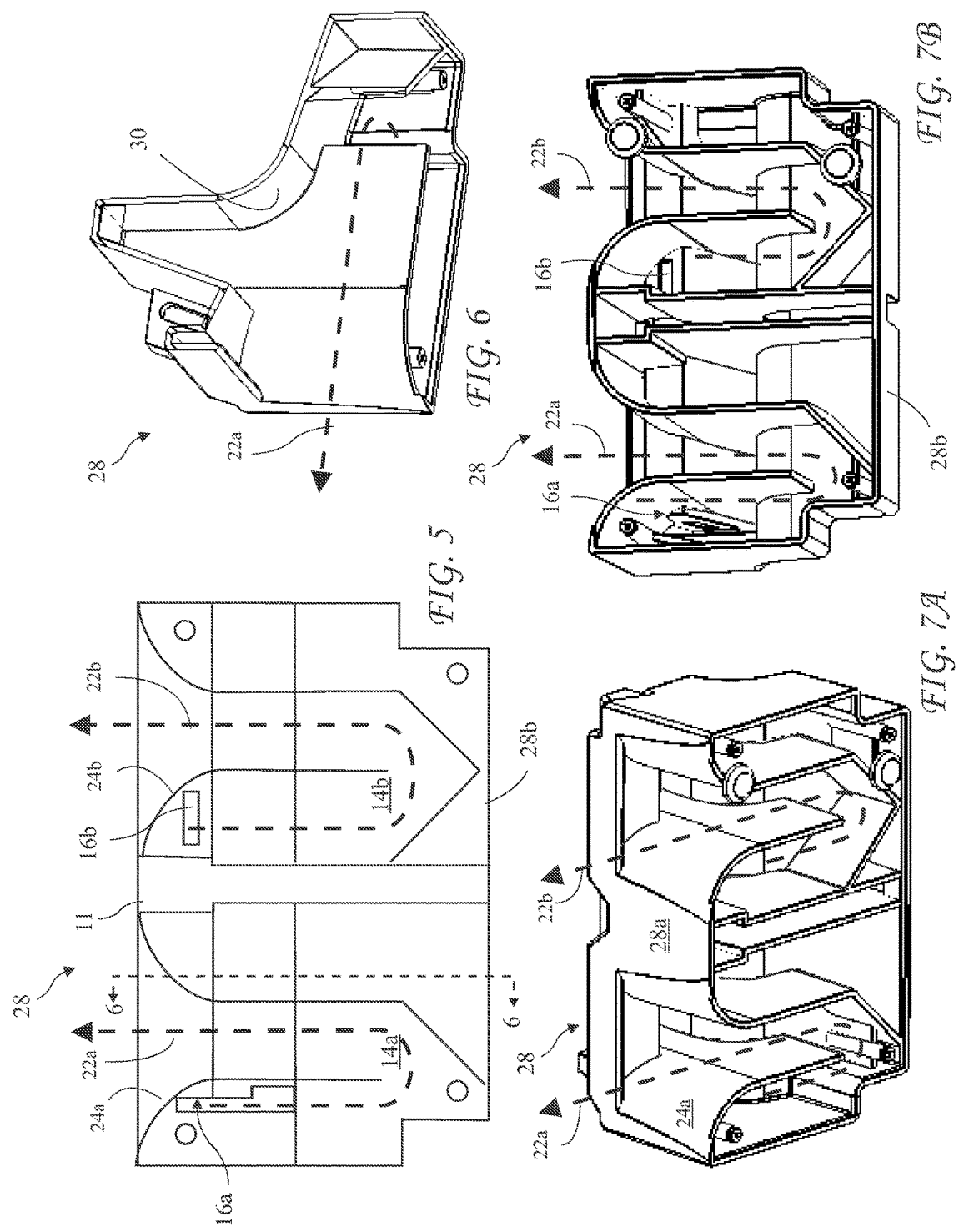

10,348,351 B2

SMART PHONE ACOUSTIC ENHANCER

BACKGROUND OF THE INVENTION

The present invention relates to smart phones and in particular to enhancing sound produced by smart phones.

Smart phones have been widely accepted as replacements for common cell phones are used world wide and over two billion smart phones users are projected on 2017. Smart phones are commonly used a speaker phones for hands free operation, and are also commonly used to play music. Unfortunately, known smart phones have very limited space for speaker, and often do not produce a desired sound quality. While the smart phones may be electrically connected to amplifiers and external speakers through cables or Bluetooth®, such use requires additional electrical devices and power sources. There remains a need for a simple, low cost, acoustic enhancement device for use with smart phones.

BRIEF SUMMARY OF THE INVENTION

The present invention addresses the above and other needs by providing a smart phone acoustic enhancer provides a support body and sound enhancing acoustic passages ending in horns. The body allows either vertical or horizontal placement of the smart phone, and includes entry ports into the sound enhancement acoustic passages for both vertical and horizontal smart phone positions. The ports align with smart phone speakers in both vertical and horizontal smart phone positions and flow into the sound enhancement acoustic passages. The horns are formed at ends of the acoustic passages to improve an acoustic impedance match between a sound source and free air thereby improving the efficiency with which sound waves are transferred to the air.

In accordance with one aspect of the invention, there is provided a simple to manufacture smart phone acoustic enhancer. The enhancer is a two piece molded product having a body and flat bottom cover.

In accordance with another aspect of the invention, there is provided a smart phone acoustic enhancer improving sound produced by the smart phone. Two acoustic passages have ports aligned with smart phone speaker positions and form horns to present the acoustic signal to a listener. The acoustic passages reach to the rear of the enhancer and turn 180 degrees reaching to the front of the enhancer to the horns.

In accordance with still another aspect of the invention, there is provided a smart phone acoustic enhancer including horizontal horns. The horizontal horns shape the horizontal coverage of the sound produced by the enhancer.

In accordance with yet another aspect of the invention, there is provided a smart phone acoustic enhancer accepting a horizontal OT vertical smart phone position. Two ports and acoustic passages are provided, matching the two smart phone positions. A cord slot is provided allowing charging the smart phone while in use.

In accordance with another aspect of the invention, there is provided a smart phone acoustic enhancer manufactured in two pieces using injection molding. The envelope of body of the smart phone acoustic enhancer forms acoustic passages without requiring internal features, allowing a simple two mold process.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 4A is a front view of the smart phone acoustic enhancer according to the present invention.

FIG. 4B is a top view of the smart phone acoustic enhancer according to the present invention.

FIG. 4C is a bottom view of the smart phone acoustic enhancer according to the present invention.

FIG. 4D is a right side view of the smart phone acoustic enhancer according to the present invention.

FIG. 4E is a left side view of the smart phone acoustic enhancer according to the present invention.

FIG. 4F is a rear view of the smart phone acoustic enhancer according to the present invention.

FIG. 5 is a bottom view of a body of the smart phone acoustic enhancer according to the present invention with a bottom cover removed.

FIG. 6 is a cross-sectional view of the body of the smart phone acoustic enhancer according to the present invention taken along line 6-6 of FIG. 5.

FIGS. 7A and 7B show isometric bottom views of a body of the smart phone acoustic enhancer according to the present invention.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement. The term lateral refers to a left to right dimension, and the term longitudinal refers to a front to rear dimension.

Figure 1A:
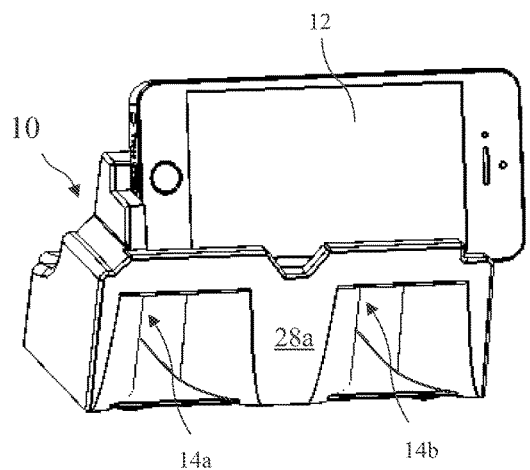
FIG. 1A shows an isometric front view of a smart phone acoustic enhancer according to the present invention and a horizontally positioned smart phone.
Figure 1B:
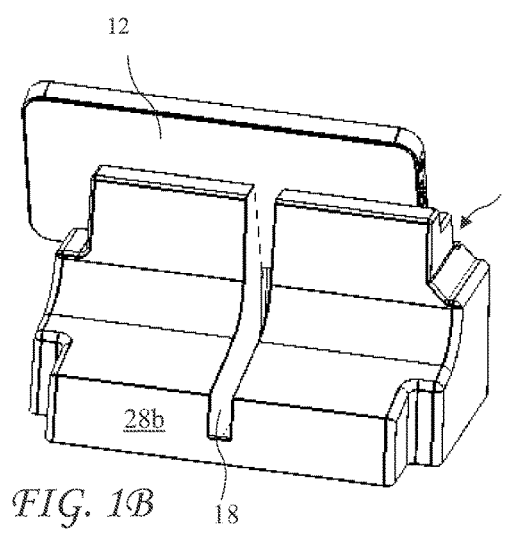
FIG. 1B shows an isometric rear view of the smart phone acoustic enhancer according to the present invention and the horizontally positioned smart phone.

An isometric front view of a smart phone acoustic enhancer 10 according to the present invention and a horizontally positioned smart phone 12 is shown in FIG. 1A and an isometric rear view of the smart phone acoustic enhancer 10 and the horizontally positioned smart phone 12 is shown in FIG. 1B. The enhancer 10 includes acoustic passage 14a in acoustic communication between a smart phone microphone and a horn 24a (see FIG. 5) and open at a front 28a of the body 28 to enhance sound produced by the smart phone 12 in the horizontal position.

Figure 2A:
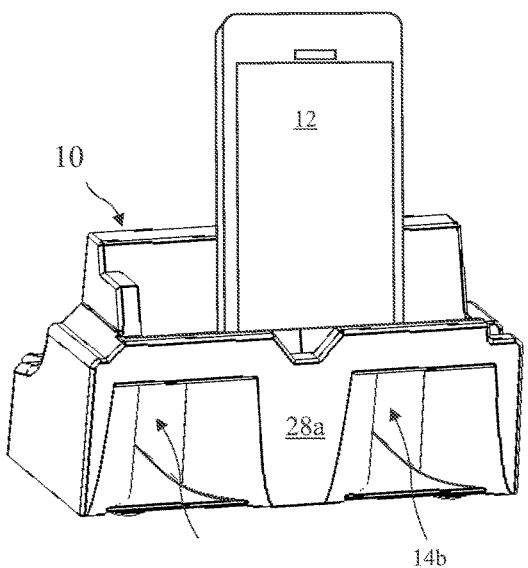
FIG. 2A shows an isometric front view of the smart phone acoustic enhancer according to the present invention and a vertically positioned smart phone.
Figure 2B:
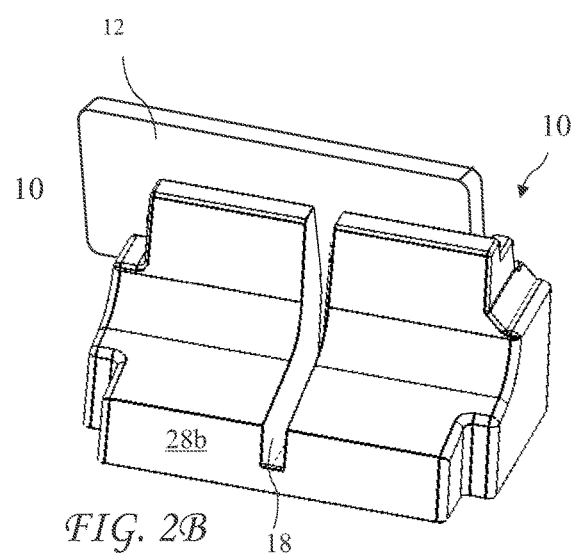
FIG. 2B shows an isometric rear view of the smart phone acoustic enhancer according to the present invention and the vertically positioned smart phone.

An isometric front view of a smart phone acoustic enhancer 10 and a vertically positioned smart phone 12 is shown in FIG. 2A and an isometric rear view of the smart phone acoustic enhancer 10 and the vertically positioned smart phone 12 is shown in FIG. 2B. The enhancer 10 includes acoustic passage 14b in acoustic communication between the smart phone microphone and a horn 24b (see FIG. 5) and open at the front 28a of the body 28 to enhance sound produced by the smart phone 12 in the vertical position. A cord slot 18 allows the smart phone 12 to be connected to a charger while residing in the enhancer 10.

Figure 3A:
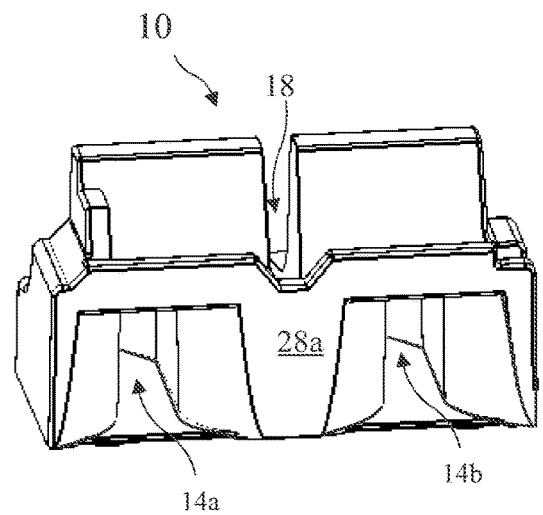
FIG. 3A is an isometric front view of the smart phone acoustic enhancer according to the present invention.
Figure 3B:
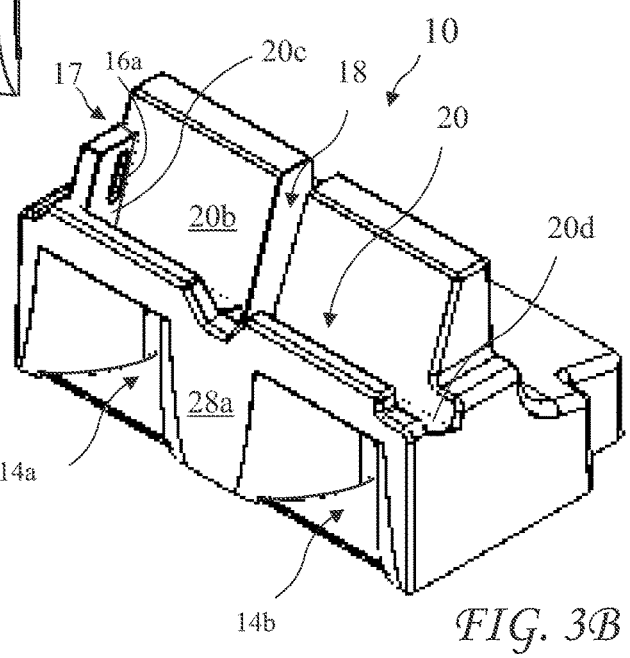
FIG. 3B is an isometric front and side view of the smart phone acoustic enhancer according to the present invention.
Figure 3C:
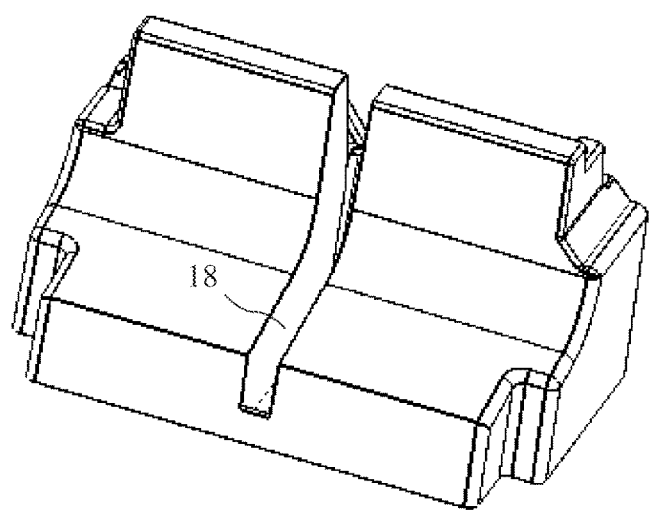
FIG. 3C is an isometric rear view of the smart phone acoustic enhancer according to the present invention.

An isometric front view of the smart phone acoustic enhancer 10 is shown in FIG. 3A, an isometric front and side view of the smart phone acoustic enhancer 10 is shown in FIG. 3B, and an isometric rear view of the smart phone acoustic enhancer 10 is shown in FIG. 3C. The enhancer includes a phone shelf 20 having a floor 20a (see FIGS. 4B and 4E), a wall 20b, a closed end 20c, and an open end 20d. A first port 16a resides in the closed end and is in acoustic communication with the acoustic passage 14a. A notch 17 above the port 16a provides space for a charger cord.

A front view of the smart phone acoustic enhancer 10 is shown in FIG. 4A, a top view of the enhancer 10 is shown in FIG. 4B, a bottom view of the enhancer 10 is shown in FIG. 4C, a right side view of the enhancer 10 is shown in FIG. 4D, a left side view of the enhancer 10 is shown in FIG. 4E, and a rear view of the enhancer 10 is shown in FIG. 4D. The enhancer 10 includes a body 28 and bottom plate (or enhancer floor) 26. The bottom plate 26 further provides a floor for acoustic passages 14a and 14b. A second port 16b resides in the floor 20a and is in acoustic cooperation with the acoustic passage 14b. Additional ports may be added for smart phones have two or more speakers, or different speaker placement, for example, a third port 16c may reside in the floor 20a and is in acoustic cooperation with one of the acoustic passages.

A cross-sectional view of the body 28 of the enhancer 10 taken along line 6-6 of FIG. 5 is shown in FIG. 6. The body 28 provides a ceiling 30 of the acoustic passages 14 and 14b. The ceiling 30 is flat in the lateral dimension and curved in the longitudinal dimension.

A bottom view of the body 28 is shown in FIG. 5 and isometric bottom views of the body 28 are shown in FIGS. 7A and 7B. Sound propagation paths 22a and 22b reach from the ports 16a and 16b, through the acoustic passages 14a and 14b reaching towards a rear 28b of the body 28, to horizontal horns 24a and 24b respectively. The horizontal horns 24a and 24b improve an acoustic impedance match between a sound source and free air thereby improving the efficiency with which sound waves are transferred to the air increasing the audio volume of the smart phone 12. The bottom plate 26 provides a lower boundary of the acoustic passages 14a and 14b and the horizontal horns 24a and 24b.

The smart phone acoustic enhancer 10 is preferably manufactured in only two pieces using injection molding to reduce cost. The envelope of the body 28 forms acoustic passages without requiring internal features, allowing a simple two mold process. Specifically, as seen in FIG. 6, the body 28 preferably does not include any structure preventing molding using a two piece mold, such as internal passages or structure blocking vertical release of the molded part from the mold. For example, the body 28 preferably is a concave structure with vertical and monotonically receding surfaces.

While the invention herein disclosed has been described by means of specific embodiments and applications thereof, numerous modifications and variations could be made thereto by those skilled in the art without departing from the scope of the invention set forth in the claims.

I claim:

1. An acoustic enhancer, comprising:
   a generally planar bottom plate;
   an outer casing disposed on the bottom plate;
   acoustic walls disposed above and generally perpendicular to the bottom plate and within the outer casing, defining a sound propagation path;
   a shelf arranged in fixed relation to sidewalls of the outer casing above the acoustic walls; and
   a support wall arranged in fixed relation to the sidewalls of the outer casing and to the shelf, above the acoustic walls;
   wherein the shelf and support wall are mutually configured to support an oblong device such that an edge of the oblong device rests on the shelf and a face of the oblong device is arranged in contact with the support wall;
   wherein at least one of the outer casing, the shelf, and the support wall includes a respective at least one acoustic port; and
   wherein the sound propagation path originates at the at least one acoustic port and terminates at an open horn end.

2. The acoustic enhancer of claim 1, wherein:
   the horn end opens toward a front of the outer casing;
   the acoustic walls define the sound propagation path such that the sound propagation path begin at the at least one acoustic port, is directed from the port toward a back of the outer casing, and then is directed toward the horn end.

3. The acoustic enhancer of claim 1, wherein the sound propagation path fans outward at the horn end.

4. The acoustic enhancer of claim 1, wherein the support wall includes a notch.

5. The acoustic enhancer of claim 1, wherein the support wall is arranged as two support walls having a gap therebetween.

6. The acoustic enhancer of claim 1, wherein the support wall is arranged at an obtuse angle with respect to the shelf.

7. The acoustic enhancer of claim 6, wherein the shelf and support wall are mutually configured to support the oblong device such that the edge of the oblong device rests on the shelf and the face of the oblong device rests against the support wall.

8. The acoustic enhancer of claim 1, wherein:
   the shelf covers a portion of an area above the acoustic walls; and
   the outer casing includes a top component that covers at least a portion of the area above the acoustic walls not covered by the shelf.

9. The acoustic enhancer of claim 1, wherein:
   the shelf covers only a first portion of an area above the acoustic walls; and
   the outer casing includes a top component that covers only a second portion of the area above the acoustic walls.

10. The acoustic enhancer of claim 1, wherein the acoustic port is arranged in the shelf.

11. The acoustic enhancer of claim 1, wherein the acoustic port is arranged in the support wall.

12. The acoustic enhancer of claim 1, wherein:
the outer casing includes an end piece arranged in fixed relation to the shelf and the support wall; and
the acoustic port is arranged in the end piece.

13. An acoustic enhancer, comprising:
a generally planar bottom plate;
an outer casing disposed on the bottom plate;
acoustic walls disposed above and generally perpendicular to the bottom plate and within the outer casing defining first and second sound propagation paths;
a shelf arranged in fixed relation to sidewalls of the outer casing above the acoustic walls;
a support wall arranged in fixed relation to the sidewalls of the outer casing and to the shelf above the acoustic walls; and
an end wall arranged in fixed relation to the shelf and the support wall;
wherein the shelf and support wall are mutually configured to support an oblong device such that an edge of the oblong device rests on the shelf and a face of the oblong device is arranged in contact with the support wall;
wherein at least one of the end wall, the shelf, and the support wall includes a respective at least one acoustic port;
wherein the first and second sound propagation paths originate at the at least one acoustic port and terminate at respective first and second open horn ends;
wherein the first and second open horn ends open toward a front of the outer casing;
wherein the acoustic walls define the first and second sound propagation paths such that the first and second sound propagation paths begin at the at least one acoustic port, are directed from the at least one acoustic port toward a back of the outer casing, and then are directed toward the first and second open horn ends; and
wherein the first and second sound propagation paths fan outward at the first and second open horn ends.

14. The acoustic enhancer of claim 13, wherein the support wall is arranged as two support walls having a gap therebetween.

15. The acoustic enhancer of claim 13, wherein:
the support wall is arranged at an obtuse angle with respect to the shelf; and
the shelf and support wall are mutually configured to support the oblong device such that the edge of the oblong device rests on the shelf and the face of the oblong device rests against the support wall.

16. The acoustic enhancer of claim 13, wherein:
the shelf covers a portion of an area above the acoustic walls; and
the outer casing includes a top component that covers at least a portion of the area above the acoustic walls not covered by the shelf.

17. The acoustic enhancer of claim 13, wherein:
the shelf covers only a first portion of an area above the acoustic walls; and
the outer casing includes a top component that covers only a second portion of the area above the acoustic walls.

18. The acoustic enhancer of claim 13, wherein the at least one acoustic port is a first acoustic port and a second acoustic port.

19. The acoustic enhancer of claim 18, wherein the first acoustic port is arranged in the end wall, and the second acoustic port is arranged in one of the shelf and the support wall.

20. An acoustic enhancer, comprising:
holding means for supporting an oblong device such that an edge of the oblong device rests on a lower portion of the holding means and a face of the oblong device is arranged in contact with a lateral portion of the holding means; and
acoustic confining means defining a sound propagation path below the holding means;
wherein the holding means includes an acoustic port;
wherein the sound propagation path originates at the acoustic port and terminates at an open horn end;
wherein the acoustic confining means defines the sound propagation path such that the sound propagation path begins at the acoustic port, is directed from the acoustic port in a first direction, and then is directed in a second direction; and
wherein the sound propagation path fans outward at the open horn end.

* * * * *